US009538093B2

(12) United States Patent
Chen et al.

(10) Patent No.: US 9,538,093 B2
(45) Date of Patent: Jan. 3, 2017

(54) FORMING HIGH-DYNAMIC-RANGE (HDR) IMAGES USING SINGLE-CHANNEL DATA

(71) Applicant: Huawei Technologies Co., Ltd., Shenzhen (CN)

(72) Inventors: Hai Chen, Shenzhen (CN); Yan Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/663,891

(22) Filed: Mar. 20, 2015

(65) Prior Publication Data

US 2015/0195441 A1    Jul. 9, 2015

Related U.S. Application Data

(63) Continuation of application No. PCT/CN2013/073824, filed on Apr. 7, 2013.

(30) Foreign Application Priority Data

Sep. 20, 2012    (CN) .......................... 2012 1 0351891

(51) Int. Cl.
  *H04N 5/235*    (2006.01)
  *H04N 5/357*    (2011.01)
  (Continued)

(52) U.S. Cl.
  CPC ............. *H04N 5/2355* (2013.01); *G06T 5/009* (2013.01); *H04N 5/2356* (2013.01); *H04N 5/357* (2013.01);
  (Continued)

(58) Field of Classification Search
  CPC .... H04N 5/2355; H04N 5/357; H04N 5/2356; G06T 5/009; G06T 5/50; G06T 2207/10016; G06T 2207/10024; G06T 2207/10144; G06T 2207/20208
  See application file for complete search history.

(56) References Cited

U.S. PATENT DOCUMENTS

2008/0012965 A1* 1/2008 Kitani .................... H04N 5/361
                                                                              348/243
2008/0266418 A1* 10/2008 Imai ....................... H04N 5/235
                                                                              348/229.1

(Continued)

FOREIGN PATENT DOCUMENTS

CN    101816171 A    8/2010
CN    102420944 A    4/2012

(Continued)

OTHER PUBLICATIONS

Partial English Translation and Abstract of Chinese Patent Application No. CN102420944A, Apr. 8, 2015, 5 pages.

(Continued)

Primary Examiner — Albert Cutler
(74) Attorney, Agent, or Firm — Conley Rose, P.C.

(57) ABSTRACT

An image processing method and apparatus are provided. The image processing method includes collecting at least two exposure frames with different brightness in a same scene during different exposure time; combining, for each exposure frame, a raw data unit arranged repeatedly in the exposure frame to obtain first brightness data after the combining; acquiring a correction parameter of all exposure frames according to all first brightness data and performing weighting processing on all the exposure frames by using the correction parameter to obtain a high dynamic range (HDR) image of corrected raw data. The foregoing method can resolve a problem in the prior art that colors, brightness, and contrast of an image obtained from Raw data are severely distorted.

16 Claims, 8 Drawing Sheets

(51) Int. Cl.
*G06T 5/00* (2006.01)
*G06T 5/50* (2006.01)

(52) U.S. Cl.
CPC ............... *G06T 2207/10016* (2013.01); *G06T 2207/10024* (2013.01); *G06T 2207/10144* (2013.01); *G06T 2207/20208* (2013.01)

(56) References Cited

U.S. PATENT DOCUMENTS

| | | |
|---|---|---|
| 2009/0091645 A1 | 4/2009 | Trimeche et al. |
| 2010/0328490 A1 | 12/2010 | Kurane et al. |
| 2011/0013848 A1 | 1/2011 | Hasegawa |
| 2011/0050950 A1* | 3/2011 | Nomura ............... H04N 5/235 348/224.1 |
| 2011/0317027 A1 | 12/2011 | Shinmei et al. |
| 2012/0008006 A1 | 1/2012 | Muramatsu |
| 2012/0257077 A1* | 10/2012 | Suzuki ............... H04N 5/2355 348/222.1 |

FOREIGN PATENT DOCUMENTS

| | | |
|---|---|---|
| CN | 102970549 A | 3/2013 |
| JP | 2006217277 A | 8/2006 |
| JP | 2012010104 A | 1/2012 |
| JP | 2012019392 A | 1/2012 |

OTHER PUBLICATIONS

Partial English Translation and Abstract of Chinese Patent Application No. CN102970549A, Part 1, Apr. 8, 2015, 6 pages.
Partial English Translation and Abstract of Chinese Patent Application No. CN102970549A, Part 2, Apr. 8, 2015, 3 pages.
Foreign Communication From a Counterpart Application, PCT Application No. PCT/CN2013/073824, English Translation of International Search Report dated Jul. 18, 2013, 2 pages.
Foreign Communication From a Counterpart Application, PCT Application No. PCT/CN2013/073824, English Translation of Written Opinion dated Jul. 18, 2013, 9 pages.
Foreign Communication From a Counterpart Application, Chinese Application No. 2015-532275, Chinese Office Action dated Jul. 5, 2016, 3 pages.
Foreign Communication From a Counterpart Application, Chinese Application No. 2015-532275, Translation of Chinese Office Action dated Jul. 5, 2016, 3 pages.
Partial English Translation and Abstract of Japanese Patent Application No. JPA2006217277, Aug. 10, 2016, 26 pages.
Partial English Translation and Abstract of Japanese Patent Application No. JPA2012010104, Aug. 10, 2016, 81 pages.
Partial English Translation and Abstract of Japanese Patent Application No. JPA2012019392, Aug. 10, 2016, 36 pages.

\* cited by examiner

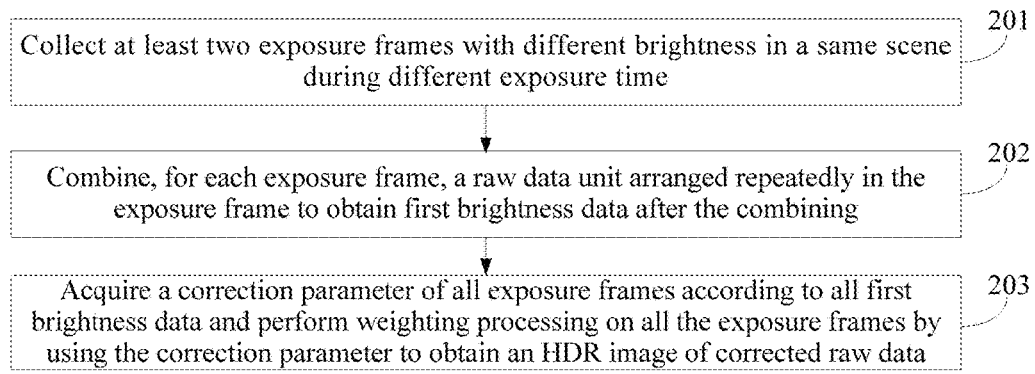

201 Collect at least two exposure frames with different brightness in a same scene during different exposure time

202 Combine, for each exposure frame, a raw data unit arranged repeatedly in the exposure frame to obtain first brightness data after the combining

203 Acquire a correction parameter of all exposure frames according to all first brightness data and perform weighting processing on all the exposure frames by using the correction parameter to obtain an HDR image of corrected raw data

FIG. 2

FORMING HIGH-DYNAMIC-RANGE (HDR) IMAGES USING SINGLE-CHANNEL DATA

CROSS-REFERENCE TO RELATED APPLICATIONS

This application is a continuation of International Application No. PCT/CN2013/073824, filed on Apr. 7, 2013, which claims priority to Chinese Patent Application No. 201210351891.6, filed on Sep. 20, 2012, both of which are hereby incorporated by reference in their entireties.

TECHNICAL FIELD

Embodiments of the present invention relate to communications technologies, and in particular, to an image processing method and apparatus.

BACKGROUND

Research on a high dynamic range (HDR) imaging based on multi-frame exposure combination has been extremely mature. For example, in a consumer market, an iPhone® is integrated with an HDR photographing function. Android® reference platforms of some chips also have a relatively simple HDR imaging function.

Currently, both surveillance cameras for a professional application and mobile phone cameras in the consumer market use a charge-coupled device (CCD) or complementary metal-oxide-semiconductor (CMOS) image sensor to capture an optical signal in a scene and transform the optical signal into raw data of a digital signal (that is, Raw data). After being processed by a series of digital signal processing technologies (e.g., Image Signal Processing (ISP)), the raw signal is transformed into a final video signal that is suitable for human eyes (generally in red green blue (RGB) format or luminance and chrominance (YUV) format).

The Raw data is single-channel data, which is generally formed by multiple adjacent pixels that are arranged repeatedly and are in different colors, and each pixel location has only one value. However, data after color interpolation processing in the ISP increases to three-channel data, that is, each pixel location has three values.

Most HDR processing technologies are applied to three-channel data after the ISP processing, for example, Microsoft® (Special Interest Group on Graphics (SIGGRAPH) 2003 HDR video) proposes a post processing method for correcting multiple exposure frames. First, a camera response curve is calibrated by using the multiple exposure frames; and then an HDR image is combined according to the camera response curve; finally, a dynamic range is compressed by using a tone mapping method to improve local contrast.

Disadvantages of the foregoing method are as follows. Triple amount of raw data needs to be processed, and further, such methods as local tone mapping or contrast enhancement need to be used to improve the local contrast. High complexity is involved. In addition, a gamma correction in the ISP processing greatly affects brightness of an image. Such method depends on the camera response curve and the tone mapping, and if the method is simply applied to the Raw data for direct processing, it may cause that colors and contrast of the image are seriously distorted.

SUMMARY

In view of the foregoing, for the disadvantages in the prior art, the present invention provides an image processing method and apparatus to resolve a problem in the prior art that colors, brightness, and contrast of an image obtained from Raw data are severely distorted.

According to one aspect, an embodiment of the present invention provides an image processing method, including collecting at least two exposure frames with different brightness in a same scene during different exposure time; combining, for each exposure frame, a raw data unit arranged repeatedly in the exposure frame to obtain first brightness data after the combining; and acquiring a correction parameter of all exposure frames according to all first brightness data and performing weighting processing on all the exposure frames by using the correction parameter to obtain an HDR image of corrected raw data.

According to another aspect, an embodiment of the present invention further provides an image processing apparatus, including a processor configured to collect at least two exposure frames with different brightness in a same scene during different exposure time; combine, for each exposure frame, a raw data unit arranged repeatedly in the exposure frame to obtain first brightness data after the combining; and acquire a correction parameter of all exposure frames according to all first brightness data and perform weighting processing on all the exposure frames by using the correction parameter to obtain an HDR image of corrected raw data; and a memory configured to store at least two exposure frames with different brightness that are collected by the processor.

It may be known from the foregoing technical solution that according to an image processing method and apparatus in embodiments of the present invention, first brightness data of each exposure frame is acquired, and further a correction parameter of all exposure frames is acquired according to the first brightness data, so as to perform weighting processing on the exposure frame by using the correction parameter to obtain an HDR image of corrected Raw data, thereby resolving a problem in the prior art that colors, brightness, and contrast of an image obtained from Raw data are severely distorted.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show some embodiments of the present invention, and a person of ordinary skill in the art may still derive other drawings from these accompanying drawings without creative efforts.

FIG. 1 is a schematic diagram of an arrangement structure of a Raw data unit according to an embodiment of the present invention;

FIG. 2 is a schematic flowchart of an image processing method according to an embodiment of the present invention;

DETAILED DESCRIPTION

Figure 3:
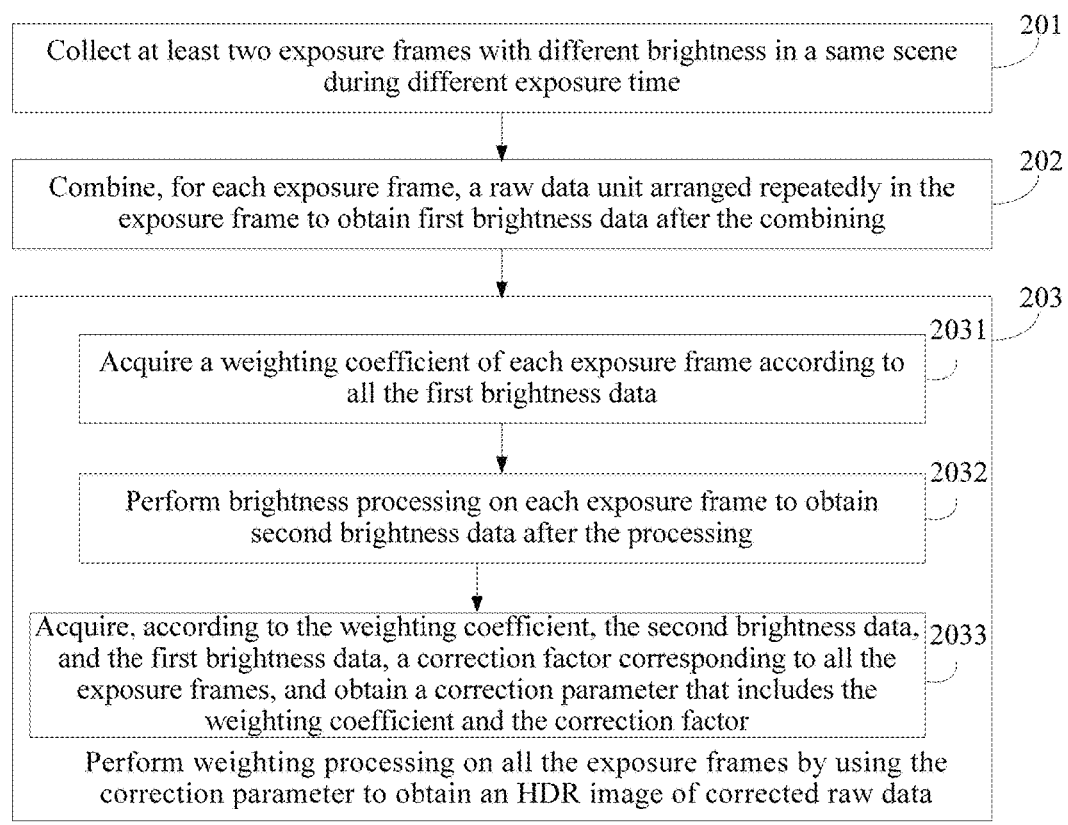
FIG. 3 is a schematic flowchart of an image processing method according to an embodiment of the present invention.

To make the objectives, technical solutions, and advantages of the present invention clearer, the following clearly describes the technical solutions of the present invention with reference to the accompanying drawings in the embodiments of the present invention. The described embodiments are a part of the embodiments of the present invention. Based on the embodiments of the present invention, a person of ordinary skill in the art can obtain other embodiments which can solve the technical problem of the present invention and implement the technical effect of the present invention by equivalently altering a part of or all the technical features even without creative efforts. The embodiments obtained through alteration do not depart from the scope disclosed in the present invention.

A method for combining HDR image based on Raw data is further proposed in the industry. In this method, an exposure time ratio of multiple exposure frames is used as a pixel value of each frame image for normalization; then an HDR image is obtained by performing a weighted combination; and a tone mapping method is used to obtain a low dynamic range (LDR) image suitable for displaying.

However, in the foregoing method, calibration is required in a process of normalizing pixels of different exposure frames by using exposure time, and the exposure time and the number of gains cannot be the same as a multiple of pixel brightness. Particularly, the foregoing method needs to use many row stores and frame stores, thereby resulting in large storage space and a complex calculation process.

Related raw data in the embodiments of the present invention is single-channel data which is generally formed by multiple adjacent pixels in different colors. As shown in FIG. 1, FIG. 1 shows a schematic diagram of an arrangement structure of raw data, that is, raw data in Bayer format, which is arranged repeatedly in a green red blue green (GRBG) pattern formed by pixels of three colors, red (R), green (G), and blue (B), and each pixel location has only one value.

In the embodiments of the present invention, raw data frames of different exposure time are mainly combined into an HDR raw data frame. Further, the foregoing process of combining HDR raw may be compatible with an ISP processing technology in the prior art. In addition, a dynamic range of a final video signal can be effectively expanded without changing original colors and local contrast, and storage costs and the amount of calculation of data can be effectively reduced. In the present invention, only single-channel data needs to be processed, with no need to calibrate a camera response curve in advance, thereby effectively reducing the storage costs and the amount of calculation of data.

The raw data frame mentioned in this embodiment of the present invention refers to an image frame formed by raw data.

With reference to FIG. 1 and FIG. 2, FIG. 1 shows a schematic diagram of an arrangement structure of a raw data unit according to an embodiment of the present invention, and FIG. 2 shows a schematic flowchart of an image processing method according to an embodiment of the present invention. The image processing method in this embodiment is described as follows.

201. Collect at least two exposure frames with different brightness in a same scene during different exposure time.

In an actual application, data input of different exposures, which may be two exposures or may be three or more exposures, is required in HDR processing. Generally, an optimal exposure frame is referred to as a reference exposure frame, and other exposure frames are referred to as extended exposure frames.

In a specific application scenario, multiple exposure frames with different brightness during different exposure time may be collected. In this case, the optimal exposure frame is selected as the reference exposure frame, and the other exposure frames are used as the extended exposure frames.

202. Combine, for each exposure frame, a raw data unit arranged repeatedly in the exposure frame to obtain first brightness data after the combining.

For example, the raw data unit in this step may be a data unit arranged in a blue green green red (BGGR) pattern, a data unit arranged in a GRBG pattern, or a data unit arranged in a green red blue white (GRBW) pattern. This embodiment of the present invention is also applicable to raw data in other patterns.

As shown in FIG. 1, FIG. 1 shows the data unit arranged in the GRBG pattern. That is, in a GRBG Bayer pattern, single-channel data at four adjacent GRBG pixel locations forms one raw data unit.

Raw data of different image sensor manufacturers is arranged in different patterns. However, for all patterns, four or more adjacent pixels form basic units that can be arranged repeatedly. Therefore, a common Bayer pattern arranged in GRBG is used as an example in this embodiment of the present invention. After a simple extension, raw data in other patterns, such as a BGGR Bayer pattern and a GRBW pattern, may also be used in this embodiment of the present invention.

203. Acquire a correction parameter of all exposure frames according to all first brightness data and perform weighting processing on all the exposure frames by using the correction parameter to obtain an HDR image of corrected raw data.

It may be understood that the foregoing raw data is single-channel data, and further the finally acquired HDR image of the raw data is also a single-channel data image.

It may be known from the foregoing embodiment that the raw data unit is a basic unit in this embodiment. First, raw basic units of different exposure frames are preprocessed, for example, are combined, and the first brightness data that is suitable for human eyes is output; and then, the correction parameter required in the HDR image of the corrected raw data is calculated, and each piece of raw data in the raw data unit is combined, so that it is implemented that an existing brightness post processing effect is combined into the output HDR image of the raw data.

In addition, in an exemplary embodiment, the acquiring a correction parameter of all exposure frames according to all first brightness data in the foregoing step 203 may include the following step 2031 to step 2033, which are shown in FIG. 3.

2031. Acquire a weighting coefficient of each exposure frame according to all the first brightness data.

2032. Perform brightness processing on each exposure frame to obtain second brightness data after the processing.

Optionally, a brightness histogram equalization method may be used to perform the brightness processing on each exposure frame to obtain the second brightness data after the processing.

2033. Acquire, according to the weighting coefficient, the second brightness data, and the first brightness data, a correction factor corresponding to all the exposure frames, and obtain a correction parameter that includes the weighting coefficient and the correction factor.

Optionally, in another application scenario, the performing weighting processing on all the exposure frames by using the correction parameter to obtain an HDR image of corrected raw data in the foregoing step 203 includes the following step 2034 not shown in the figure.

2034. Acquire a weighting coefficient, of each pixel in each exposure frame, corresponding to the exposure frame, and acquire a product obtained by multiplying the correction factor by each pixel in each exposure frame; and summate products corresponding to pixels at corresponding locations in all exposure frames, and use an image formed by all pixels obtained after the summating as the HDR image of the corrected raw data.

It may be known from the foregoing embodiment that according to an image processing method in this embodiment, first brightness data of each exposure frame is acquired, and further a correction parameter of all exposure frames is acquired according to the first brightness data, so as to perform weighting processing on the exposure frame by using the correction parameter to obtain an HDR image of corrected Raw data, thereby resolving a problem in the prior art that colors, brightness, and contrast of an image obtained from Raw data are severely distorted.

In another application scenario, the combining a raw data unit arranged repeatedly in the exposure frame to obtain first brightness data after the combining in the foregoing step 202 includes the following step 2021 not shown in the figure.

2021. Acquire a reference brightness value of the exposure frame and correct the reference brightness value by using a preset gamma coefficient to obtain the first brightness data.

For example, the acquiring a reference brightness value of the exposure frame may include the following.

1) Acquire an average value of pixels in the raw data unit and use the average value as the reference brightness value; for example, in the GRBG Bayer pattern shown in FIG. 1, the reference brightness value may be (G+R+B+G)/4.

Alternatively,

2) Acquire an average value of G pixels in the raw data unit and use the average value as the reference brightness value; for example, in the GRBG Bayer pattern shown in FIG. 1, the reference brightness value may be (G+G)/2.

The foregoing reference brightness value may be obtained by using a traditional calculation method or by means of simple combination.

That is, in the Bayer pattern shown in FIG. 1, data amount after the combining is ¼ of the raw data, thereby effectively reducing a data amount in an image processing process.

It may be known from the foregoing embodiment that a raw data unit is used as a basic unit in an image processing method in this embodiment. First, raw basic units of different exposure frames are preprocessed, such as combination, and first brightness data that is suitable for human eyes is output; then a correction parameter required in an HDR image of corrected raw data is calculated, each piece of raw data in the raw data unit is combined, and color consistency before and after the combination can be ensured by using a same weighting coefficient and correction factor in a same raw data unit; and the brightness data that is suitable for human eyes is used to calculate a combination coefficient, which can implement that an existing brightness post processing effect is combined into the output HDR image of the raw data.

In another application scenario, the image processing method is shown in the following steps S01 to S06. A correction parameter includes a weighting coefficient and a correction factor; each exposure frame corresponds to one weighting coefficient; and all exposure frames correspond to one correction factor.

Two exposure frames are used as an example in the following.

S01. Collect two exposure frames with different brightness, which are a first exposure frame and a second exposure frame, in a same scene during different exposure time.

Brightness of the first exposure frame is less than brightness of the second exposure frame, and exposure time of the first exposure frame is less than exposure time of the second exposure frame. $R_1$ represents the first exposure frame, and $R_2$ represents the second exposure frame.

S02. Combine, for each exposure frame, a raw data unit arranged repeatedly in the exposure frame to obtain first brightness data after the combining.

First brightness data of the first exposure frame is $I'_1$, and second brightness data of the second exposure frame is $I'_2$.

Exemplarily, a reference brightness value of the exposure frame is acquired, and the reference brightness value is corrected by using a preset gamma coefficient 1/2.2 in a table lookup manner to obtain the first brightness data.

S03. Acquire, for the first exposure frame, weighting coefficient $w_1$ of the first exposure frame according to first brightness data $I'_1$; acquire, for the second exposure frame, weighting coefficient $w_2$ of the second exposure frame according to second brightness data $I'_2$.

For example, weighting coefficients $w_1$ and $w_2$ are acquired according to the following formula:

$$w'_1 = \exp\left(\frac{-I'^2_1}{\delta^2}\right) \quad w'_2 = \exp\left(\frac{-(255 - I'_2)^2}{\delta^2}\right)$$

$$w_1 = \frac{w'_1}{w'_1 + w'_2} \quad w_2 = \frac{w'_2}{w'_1 + w'_2}$$

where $w'_1$ and $w'_1$ represent intermediate values for calculating the weighting coefficient, and $\delta$ represents a Gaussian distribution coefficient.

S04. Perform brightness processing on the first exposure frame in a brightness histogram equalization manner, so as to obtain second brightness data $I''_1$ after the processing; and perform brightness processing on the second exposure frame in the brightness histogram equalization manner, so as to obtain second brightness data $I''_2$ after the processing.

S05. Acquire, according to weighting coefficients $w_1$ and $w_2$, second brightness data $I''_1$ and $I''_2$, and first brightness data $I'_1$ and $I'_2$, a correction factor $\alpha$ corresponding to all exposure frames:

$$\alpha = (I''_1 * w_1 + I''_2 * w_2)/(I'_1 * w_1 + I'_2 * w_2).$$

S06. Perform weighting processing on all exposure frames by using weighting coefficients $w_1$ and $w_2$ and a correction factor $\alpha$ to obtain an HDR image of corrected raw data, which is shown in the following formula:

$$R=(R_1*w_1+R_2*w_2)*\alpha$$

where $R_1$ represents the first exposure frame, $w_1$ represents the weighting coefficient of the first exposure frame, $R_2$ represents the second exposure frame, $w_2$ represents the weighting coefficient of the second exposure frame, $\alpha$ represents the correction factor, and R represents the HDR image of the corrected raw data.

Therefore, an image with undistorted colors, brightness, and contrast can be obtained by using the foregoing image processing method.

Figure 4:
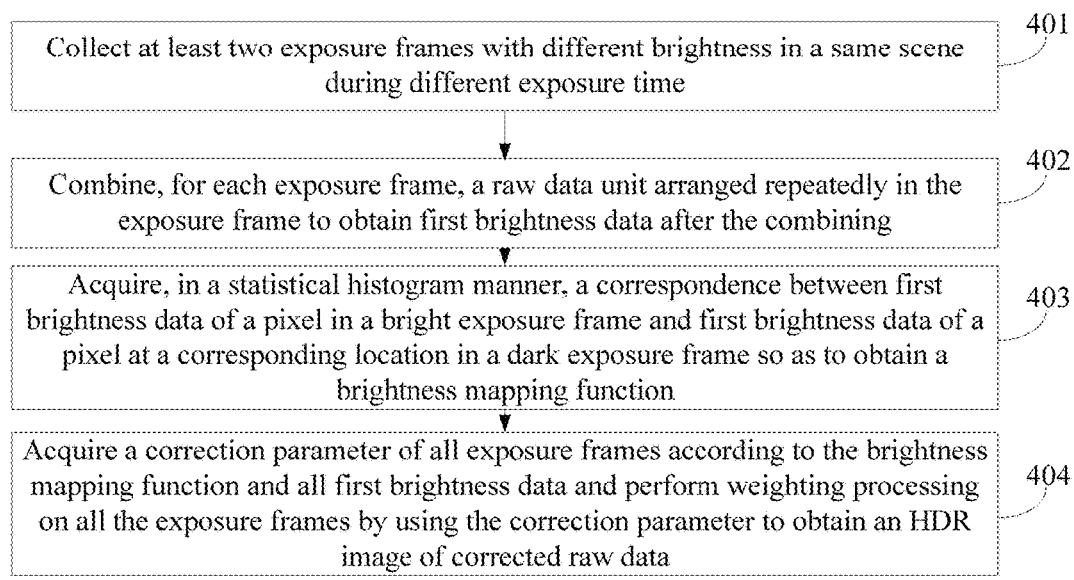
FIG. 4 is a schematic flowchart of an image processing method according to an embodiment of the present invention.

FIG. 4 shows a schematic flowchart of an image processing method according to another embodiment of the present invention. As shown in FIG. 4, steps of the image processing method in this embodiment are described as follows.

401. Collect at least two exposure frames with different brightness in a same scene during different exposure time.

402. Combine, for each exposure frame, a raw data unit arranged repeatedly in the exposure frame to obtain first brightness data after the combining.

403. Acquire, in a statistical histogram manner, a correspondence between first brightness data of a pixel in a bright exposure frame and first brightness data of a pixel at a corresponding location in a dark exposure frame so as to obtain a brightness mapping function.

The statistical histogram manner is a histogram obtained with a statistical manner.

It should be noted that herein the method for acquiring the brightness mapping function is a well-known method for a person skilled in the art.

404. Acquire a correction parameter of all exposure frames according to the brightness mapping function and all first brightness data and perform weighting processing on all the exposure frames by using the correction parameter to obtain an HDR image of corrected raw data.

It may be known from the foregoing embodiment that single-channel raw data is used in the image processing method to directly acquire the HDR image of the corrected raw data, thereby reducing the amount of calculation in a processing process. In the foregoing image processing method, a brightness processing method is used, such as histogram equalization, contrast adjustment, and brightness enhancement of a dark area. Therefore, color consistency and brightness unity of the raw HDR image can be maintained.

In another application scenario, the image processing method is shown in the following steps M01 to M06. A correction parameter includes a weighting coefficient and a correction factor; each exposure frame corresponds to one weighting coefficient; and all exposure frames correspond to one correction factor.

Two exposure frames are used as an example in the following.

M01. Collect two exposure frames with different brightness, which are a first exposure frame and a second exposure frame, in a same scene during different exposure time.

Brightness of the first exposure frame is less than brightness of the second exposure frame, and exposure time of the first exposure frame is less than exposure time of the second exposure frame. $R_1$ represents the first exposure frame, a short exposure frame, and a dark exposure frame, and $R_2$ represents the second exposure frame, a long exposure frame, and a bright exposure frame.

M02. Combine, for each exposure frame, a raw data unit arranged repeatedly in the exposure frame to obtain first brightness data after the combining.

First brightness data of the first exposure frame is $I'_1$, and second brightness data of the second exposure frame is $I'_2$.

Exemplarily, M02 may be implemented by performing the following substeps.

M021. Calculate a reference brightness value of the first exposure frame and the second exposure frame.

In step M021, a method for calculating the reference brightness value may be a traditional brightness calculation method or may be simple combination, such as (R+G+G+B)/4. In another embodiment, values of G pixels may be directly used as the reference brightness value.

The foregoing calculated data amount is ¼ of raw data, thereby effectively reducing the amount of calculation in a subsequent image processing process.

M022. Perform a gamma correction on the foregoing reference brightness value by using a gamma coefficient to obtain the first brightness data.

It should be noted that the existing gamma correction is the step, which has maximum impact on image brightness and contrast, in ISP processing, and also is one important step that transforms the raw data into data suitable for human eyes. Therefore, step M022 uses a gamma coefficient same as that in the ISP processing to process reference brightness value.

In an actual application, a value of the gamma coefficient may be 1/2.2. In this embodiment, the gamma correction may be implemented by using a table lookup method. In addition, bit width of the raw data, that is, the raw data of the exposure frame generally is relatively large, such as 10 bits, 12 bits, or even 14 bits.

To save calculation resources, only the first 8 bits in the raw data are used to perform table lookup, and an output value may also be 8-bit data.

That is, reference brightness bit width after the gamma correction may not be the same as Bayer data. Brightness data after the gamma correction is denoted as I', that is, the first brightness data of the first exposure frame is $I'_1$, and the second brightness data of the second exposure frame is $I'_2$.

M03. Acquire, in a statistical histogram manner, a correspondence between first brightness data of a pixel in a bright exposure frame (the second exposure frame) and first brightness data of a pixel at a corresponding location in a dark exposure frame (the first exposure frame) to obtain a brightness mapping function.

For example, brightness mapping function b=f(a), where a represents a brightness value of a pixel in the bright exposure frame, and f(a) represents a brightness value of a pixel at a corresponding location in the dark exposure frame.

Each group of a and f(a) is referred to as one mapping pair, and a determined mapping pair is used as the mapping.

That is, if (a, b) is a value of a corresponding lightness mapping function f from the long exposure frame (the second exposure frame) to the short exposure frame (the first exposure frame), b=f(a).

Figure 5A:
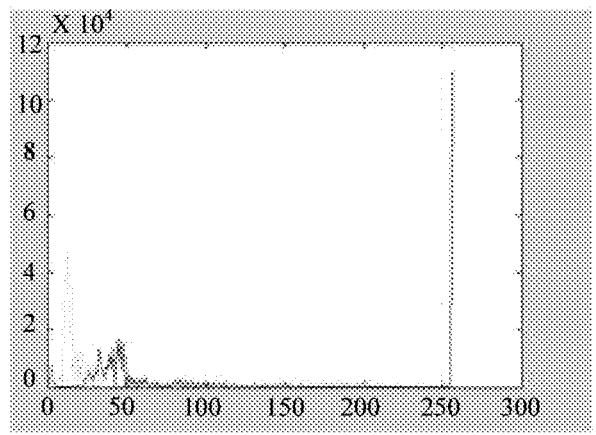
FIG. 5A is a schematic diagram of a brightness statistical histogram according to an embodiment of the present invention.
Figure 5B:
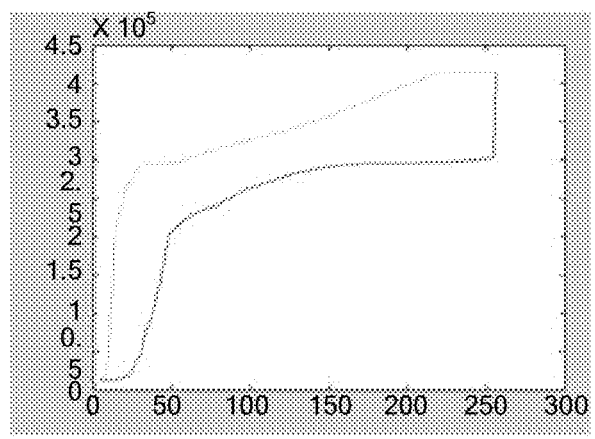
FIG. 5B is a schematic diagram of a brightness cumulative histogram according to an embodiment of the present invention.
Figure 5C:
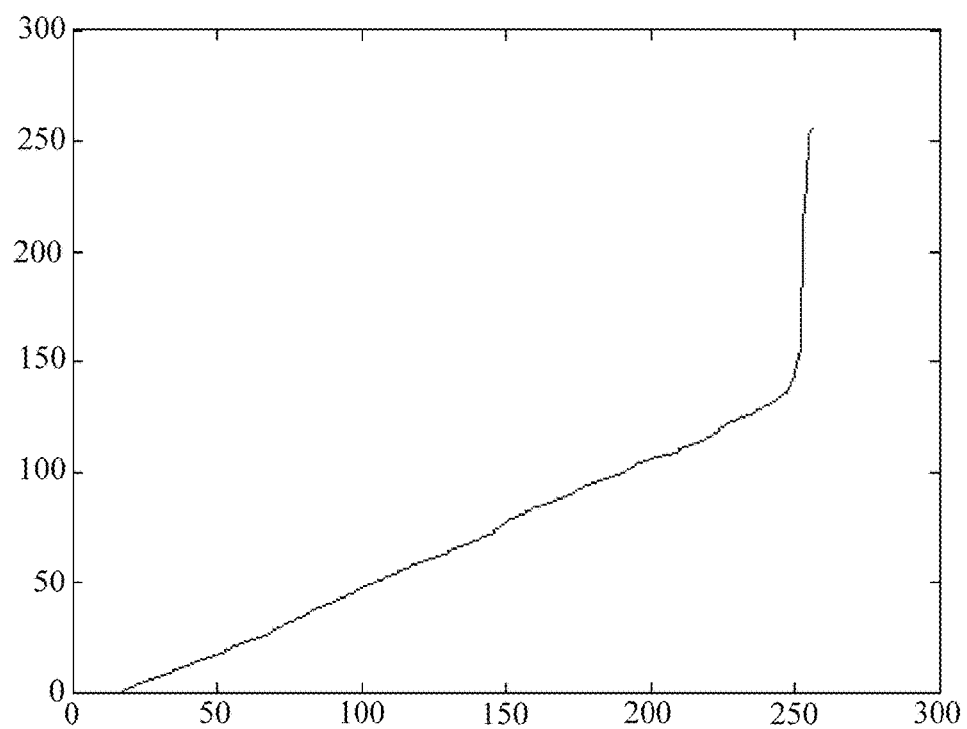
FIG. 5C is a schematic diagram of a brightness mapping function according to an embodiment of the present invention.

With reference to FIG. 5A, FIG. 5B, and FIG. 5C, the brightness mapping function b=f(a) in this embodiment may be easily obtained from a statistical histogram of the first exposure frame and the second exposure frame.

The following FIG. 5A is the histogram of the first exposure frame and the second exposure frame. After a simple accumulation, a cumulative histogram in FIG. 5B may be obtained. After the brightness mapping, a brightness mapping value (the second line is a schematic curve) may be obtained as shown in FIG. 5C, where a great number of overexposure pixels exist in an image of the second exposure frame (an extended frame) on the horizontal axis.

M04. Acquire a correction parameter of all exposure frames according to the brightness mapping function and all first brightness data and perform weighting processing on all the exposure frames by using the correction parameter to obtain an HDR image of corrected raw data.

The foregoing step M04 may be implemented by performing the following substeps M041 to M044.

M041. Acquire, for the first exposure frame, a weighting coefficient $w_1$ of the first exposure frame according to first brightness data $I'_1$ and brightness mapping function $b=f(a)$; and acquire, for the second exposure frame, a weighting coefficient $w_2$ of the second exposure frame according to second brightness data $I'_2$ and brightness mapping function $b=f(a)$.

For example, weighting coefficients $w_1$ and $w_2$ are acquired according to the following formula:

$$w'_1 = \exp\left(\frac{-(255-a+I'_1)^2}{\delta^2}\right) \quad w'_2 = \exp\left(\frac{-(255+b-I'_1)^2}{\delta^2}\right)$$

$$w_1 = \frac{w'_1}{w'_1+w'_2} \quad w_2 = \frac{w'_2}{w'_1+w'_2};$$

where $w'_1$ and $w'_2$ represent intermediate values for calculating the weighting coefficient, and $\delta$ represents a Gaussian distribution coefficient.

Generally, a dark ($I'_1$) scene in the long exposure frame (an exposure frame, which has longer exposure time, in the first exposure frame and the second exposure frame) is more suitable than a dark ($I'_2$, which is darker and tends to underexposure) scene in the short exposure frame (an exposure frame, which has shorter exposure time, in the first exposure frame and the second exposure frame).

Similarly, a bright ($I'_2$) scene in the short exposure is more suitable than a bright ($I'_1$, which is brighter and tends to overexposure) scene in the long exposure; therefore, the foregoing formula based on the Gaussian distribution is used to calculate the weighting coefficient and implement normalization.

M042. Perform brightness processing on the first exposure frame in a brightness histogram equalization manner, so as to obtain second brightness data $I''_1$ after the processing; and perform brightness processing on the second exposure frame in the brightness histogram equalization manner, so as to obtain second brightness data $I''_2$ after the processing.

Exemplarily, when the brightness histogram equalization method is adopted, image contrast may be severely changed. For example, a scene in which a dynamic range is relatively small has excessively high contrast. Therefore, several key points may be used to control the histogram after the mapping. For example, a brightness value corresponding to 25% in the cumulative histogram after the mapping must be between a brightness value corresponding to 25% in a long exposure cumulative histogram before the mapping and a brightness value corresponding to 25% in a short exposure cumulative histogram before the mapping. That is, $I'_{2\_25} \leq I'_{25} \leq I'_{1\_25}$.

M043. Acquire, according to the weighting coefficients $w_1$ and $w_2$, the second brightness data $I''_1$ and $I''_2$, and the first brightness data $I'_1$ and $I'_2$, a correction factor $\alpha$ corresponding to all exposure frames: $\alpha=(I''_1*w_1+I''_2*w_2)/(I'_1*w_1+I'_2*w_2)$.

It should be noted that the exposure time of the first exposure frame is different from the exposure time of the second exposure frame, which means that brightness is different. If simple combination is performed on a corresponding pixel, brightness unity of the final image is damaged. Therefore, in this embodiment, the correction factor $\alpha$ is set to correct different exposure frames as "one same exposure value".

M044. Perform weighting processing on all exposure frames by using the weighting coefficients and $w_1$ and $w_2$ and the correction factor $\alpha$ to obtain an HDR image of corrected raw data, which is shown in the following formula:

$$R=(R_1*w_1+R_2*w_2)*\alpha,$$

where $R_1$ represents the first exposure frame, $w_1$ represents the weighting coefficient of the first exposure frame, $R_2$ represents the second exposure frame, $w_2$ represents the weighting coefficient of the second exposure frame, $\alpha$ represents the correction factor, and R represents the HDR image of the raw data.

One advantage of the foregoing weighting calculation manner depending on the brightness mapping function is that, when the brightness of the long exposure frame and the short exposure frame is equal to mapping values (a, b), a same combination weight can be obtained, so that quality of the output HDR frame is higher.

It may be known from the foregoing embodiment that only single-channel raw data needs to be stored, which reduces the amount of calculation. The brightness processing method may be used directly, such as histogram equalization, contrast adjustment, and brightness enhancement of a dark area. Color consistency and brightness unity of the HDR image of the raw data can be maintained.

Particularly, compared with a traditional post processing HDR combination method, in the present invention, only the single-channel data needs to be processed, with no need to calibrate a camera response curve in advance, thereby effectively reducing storage costs and the amount of calculation of data.

Figure 6:
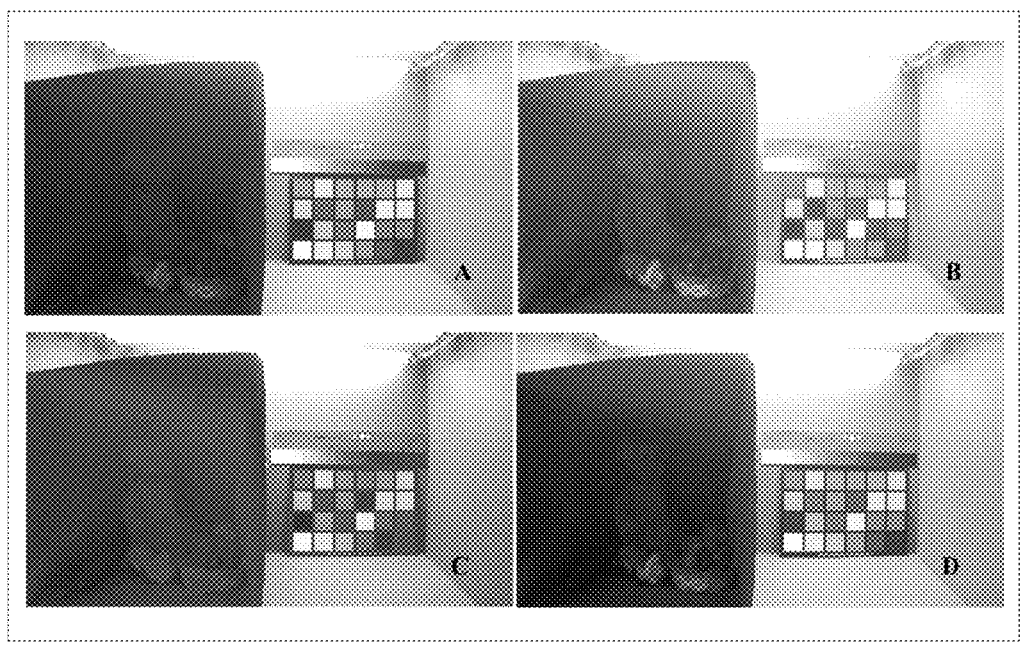
FIG. 6 is a schematic diagram of a comparison between an acquired HDR image and an existing HDR image according to an embodiment of the present invention.

As shown in FIG. 6, FIG. 6-A in FIG. 6 is an HDR image combined in a post processing manner in the prior art, and FIG. 6-B is an HDR image in which a post processing combination manner is simply applied to raw data processing (colors and contrast of a gray scale are severely changed in FIG. 6-B); and FIG. 6-C is an HDR image for which a brightness correction (brightness unity is damaged, such as the last line in the color chip) is not performed; and FIG. 6-D is an acquired HDR image after the brightness correction in this embodiment of the present invention (colors and contrast are closer to a real scene).

In addition, in the foregoing exemplary embodiment, the brightness mapping function is used in a part of embodiments to calculate the weighting coefficient, and the brightness mapping function is not used in another part of embodiments to calculate the weighting coefficient. This embodiment sets no limitation thereto, and the brightness mapping function may be selected according to an actual need.

Further, in any one of implementation manners listed in this embodiment of the present invention, the weighting coefficient is acquired by using the Gaussian distribution method. In another embodiment, such methods as Poisson distribution or Conic may be adopted to acquire the weighting coefficient, and this embodiment sets on limitation thereto.

Figure 7A:
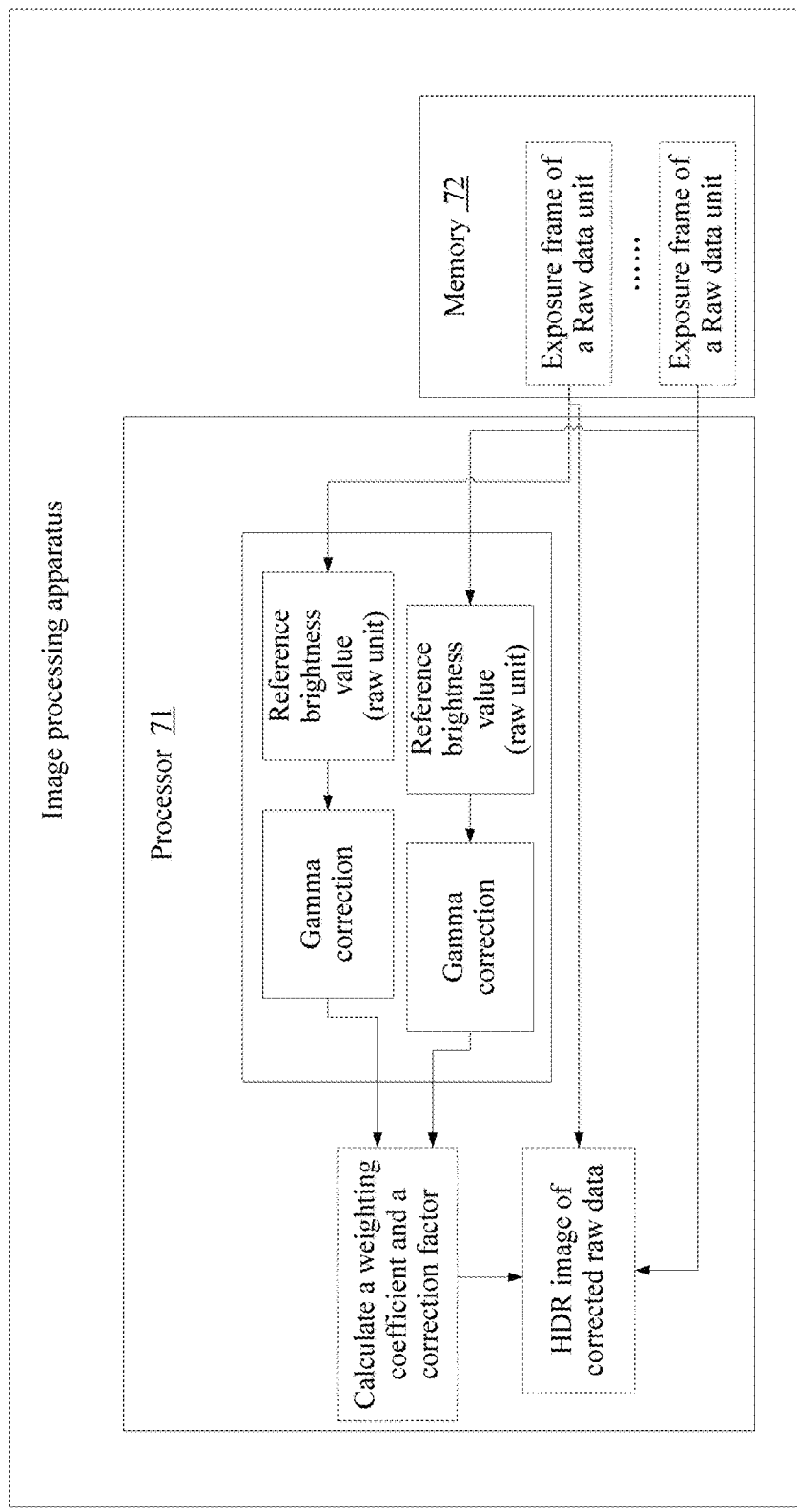
FIG. 7A and FIG. 7B are schematic structural diagrams of an image processing apparatus according to an embodiment of the present invention.
Figure 7B:
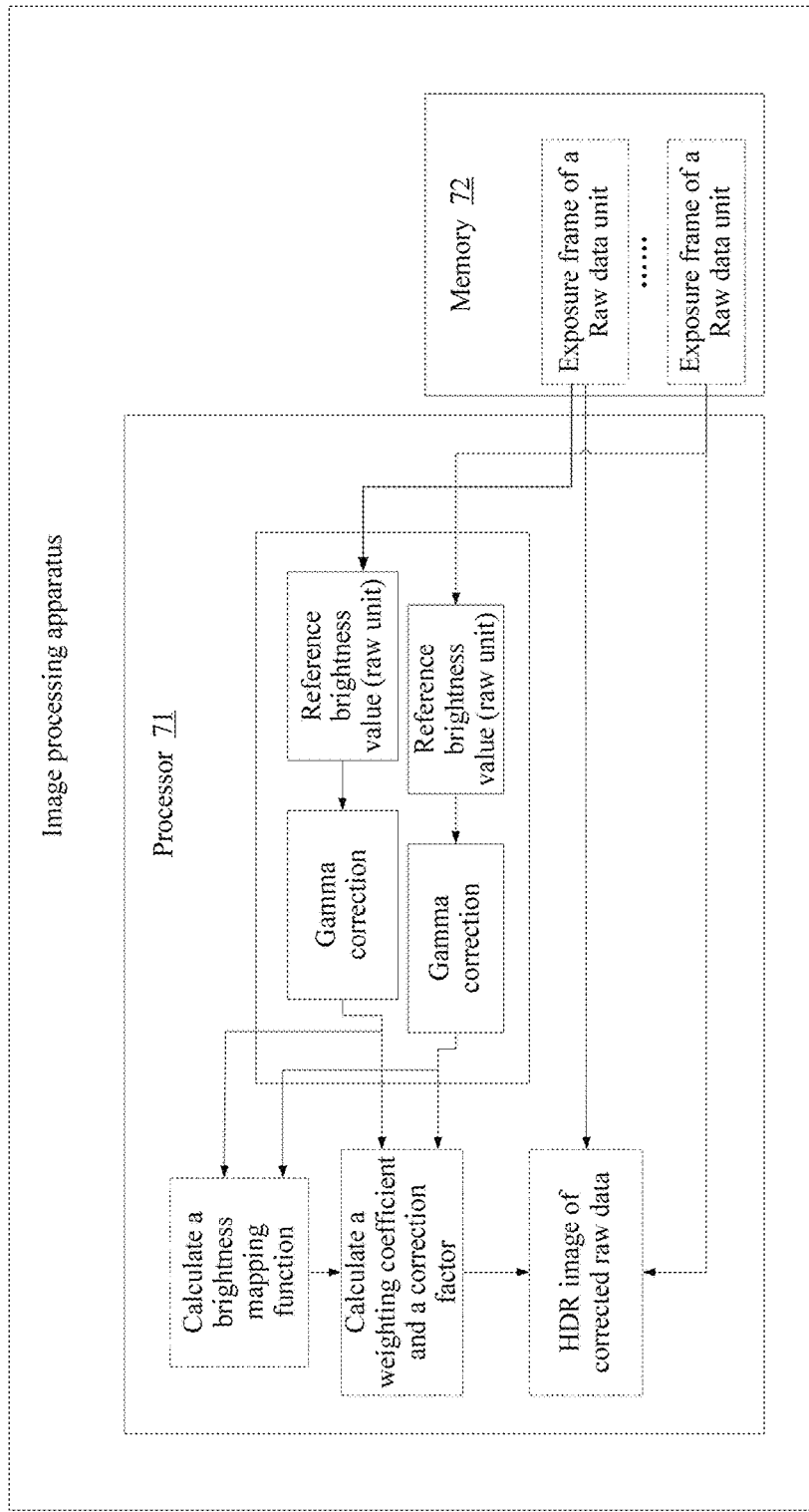

According to another aspect of the present invention, an embodiment of the present invention further provides an image processing apparatus, which is shown in FIG. 7A and FIG. 7B. The image processing apparatus shown in FIG. 7A and FIG. 7B includes a processor 71 and a memory 72.

The processor 71 is configured to collect at least two exposure frames with different brightness in a same scene during different exposure time; combine, for each exposure frame, a raw data unit arranged repeatedly in the exposure frame to obtain first brightness data after the combining; and acquire a correction parameter of all exposure frames according to all first brightness data and perform weighting processing on all the exposure frames by using the correction parameter to obtain an HDR image of corrected raw data; and the memory 72 is configured to store at least two exposure frames with different brightness that are collected by the processor.

In an actual application, the processor 71 is configured to acquire, for each exposure frame, a reference brightness value of the exposure frame, and correct the reference brightness value by using a preset gamma coefficient to obtain the first brightness data; and/or acquire a weighting coefficient of each exposure frame according to all the first brightness data; perform brightness processing on each exposure frame to obtain second brightness data after the processing; and acquire, according to the weighting coefficient, the second brightness data, and the first brightness data, a correction factor corresponding to all the exposure frames, and obtain a correction parameter that includes the weighting coefficient and the correction factor; and/or acquire a weighting coefficient, of each pixel in each exposure frame, corresponding to the exposure frame, and acquire a product obtained by multiplying the correction factor by each pixel in each exposure frame; summate products corresponding to pixels at corresponding locations in all exposure frames, and use an image formed by all pixels obtained after the summating as the HDR image of the corrected raw data.

Optionally, the processor is further configured to acquire, in a statistical histogram manner, a correspondence between first brightness data of a pixel in a bright exposure frame and first brightness data of a pixel at a corresponding location in a dark exposure frame, so as to obtain a brightness mapping function; acquire a weighting coefficient of each exposure frame according to the brightness mapping function and all first brightness data; perform brightness processing on each exposure frame to obtain second brightness data after the processing; acquire, according to the weighting coefficient, the second brightness data, and the first brightness data, a correction factor corresponding to all the exposure frames, and obtain a correction parameter that includes the weighting coefficient and the correction factor; further acquire a weighting coefficient, of each pixel in each exposure frame, corresponding to the exposure frame and acquire a product obtained by multiplying the correction factor by each pixel in each exposure frame; and summate products corresponding to pixels at corresponding locations in all exposure frames, and use an image formed by all pixels obtained after the summating as an HDR image of the corrected raw data.

The processor in this embodiment may perform the image processing method described in any one of the foregoing embodiments. Details are not described herein again.

It may be known from the foregoing embodiment that according to an image processing apparatus in this embodiment of the present invention, first brightness data of each exposure frame is acquired, and further a correction parameter of all exposure frames is acquired according to the first brightness data, so as to perform weighting processing on the exposure frame by using the correction parameter to obtain an HDR image of corrected Raw data, thereby resolving a problem in the prior art that colors, brightness, and contrast of an image obtained from Raw data are severely distorted.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An image processing method comprising:
    collecting at least two exposure frames with different brightnesses in a same scene during different exposure times;
    combining, for each exposure frame, a raw data unit arranged repeatedly in the exposure frame to obtain first brightness data after the combining, wherein the raw data unit comprises raw data that are single-channel data comprising pixels with one of a red (R) value, a green (G) value, and a blue (B) value;
    acquiring a correction parameter of all exposure frames according to all first brightness data by:
        acquiring a weighting coefficient of each exposure frame according to all the first brightness data;
        performing brightness processing on each exposure frame to obtain second brightness data after the brightness processing;
        acquiring, according to the weighting coefficient, the second brightness data, and the first brightness data, a correction factor corresponding to all the exposure frames; and
        obtaining a correction parameter that comprises the weighting coefficient and the correction factor; and
    performing weighting processing on all the exposure frames by using the correction parameter to obtain a high dynamic range (HDR) image of corrected raw data.

2. The method according to claim 1, wherein performing the weighting processing on all the exposure frames by using the correction parameter to obtain the HDR image of the corrected raw data comprises:
    acquiring a weighting coefficient, of each pixel in each exposure frame, corresponding to the exposure frame;
    acquiring a product obtained by multiplying the correction factor by each pixel in each exposure frame;
    summating products corresponding to the pixels at corresponding locations in all the exposure frames; and
    using an image formed by all the pixels obtained after the summating as the HDR image of the corrected raw data.

3. The method according to claim 1, wherein combining the raw data unit arranged repeatedly in the exposure frame to obtain the first brightness data after the combining comprises:
acquiring a reference brightness value of the exposure frame; and
correcting the reference brightness value by using a preset gamma coefficient to obtain the first brightness data.

4. The method according to claim 3, wherein acquiring the reference brightness value of the exposure frame comprises:
acquiring an average value of the pixels in the raw data unit; and
using the average value as the reference brightness value.

5. The method according to claim 3, wherein acquiring the reference brightness value of the exposure frame comprises:
acquiring an average value of green pixels in the raw data unit; and
using the average value as the reference brightness value.

6. The method according to claim 1, wherein two exposure frames with different brightnesses, which are a first exposure frame $R_1$ and a second exposure frame $R_2$, are collected in a same scene during different exposure times, and wherein acquiring the weighting coefficient of each exposure frame according to all the first brightness data comprises calculating:

$$w'_1 = \exp\left(\frac{-I_1'^2}{\delta^2}\right) \quad w'_2 = \exp\left(\frac{-(255 - I'_2)^2}{\delta^2}\right)$$
$$w_1 = \frac{w'_1}{w'_1 + w'_2} \quad w_2 = \frac{w'_2}{w'_1 + w'_2};$$

wherein w'$_1$ and w'$_2$ represent intermediate values for calculating the weighting coefficient, w$_1$ represents a weighting coefficient of the first exposure frame, w$_2$ represents a weighting coefficient of the second exposure frame, δ represents a Gaussian distribution coefficient, I'$_1$ represents first brightness data of the first exposure frame, and I'$_2$ represents first brightness data of the second exposure frame.

7. The method according to claim 6, wherein acquiring, according to the weighting coefficient, the second brightness data, and the first brightness data, the correction factor corresponding to all the exposure frames comprises calculating:

$$\alpha = (I''_1 * w_1 * I''_2 * w_2)/(I'_1 * w_1 + I'_2 * w_2),$$

wherein α represents the correction factor, I"$_1$ represents second brightness data of the first exposure frame and I"$_2$ represents second brightness data of the second exposure frame.

8. The method according to claim 6, wherein performing the weighting processing on all the exposure frames by using the correction parameter to obtain the HDR image of the corrected raw data comprises calculating R=(R$_1$*w$_1$+ R$_2$*w$_2$)*α to obtain an HDR image of the corrected raw data when the correction parameter is weighting coefficients w$_1$ and w$_2$ and the correction factor, wherein R$_1$ represents the first exposure frame, w$_1$ presents the weighting coefficient of the first exposure frame, R$_2$ represents the second exposure frame, w$_2$ represents the weighting coefficient of the second exposure frame, a represents the correction factor, and R represents the HDR image of the corrected raw data.

9. The method according to claim 1, wherein before acquiring the correction parameter of all the exposure frames according to all the first brightness data, the method further comprises acquiring, in a statistical histogram manner, a correspondence between first brightness data of a pixel in a bright exposure frame and first brightness data of a pixel at a corresponding location in a dark exposure frame to obtain a brightness mapping function, and wherein acquiring the correction parameter of all the exposure frames according to all the first brightness data comprises acquiring the correction parameter of all the exposure frames according to the brightness mapping function and all the first brightness data.

10. The method according to claim 9, wherein two exposure frames with different brightnesses, which are a long exposure frame and a short exposure frame, are collected in a same scene during different exposure times, wherein the brightness mapping function is b=f(a), wherein a represents a brightness value of a pixel in the long exposure frame and b represents a brightness value of a pixel which is in the short exposure frame and whose location is correspondingly consistent with a location of a, and wherein acquiring the correction parameter of all the exposure frames according to the brightness mapping function and all the first brightness data comprises acquiring the weighting coefficient of each exposure frame according to the following formulas:

$$w'_1 = \exp\left(\frac{-(255 - a + I'_1)^2}{\delta^2}\right) \quad w'_2 = \exp\left(\frac{-(255 + b - I'_1)^2}{\delta^2}\right)$$
$$w_1 = \frac{w'_1}{w'_1 + w'_2} \quad w_2 = \frac{w'_2}{w'_1 + w'_2};$$

wherein w'$_1$ and w'$_2$ represent intermediate values for calculating the weighting coefficient, w$_1$ represents a weighting coefficient of a first exposure frame, w$_2$ represents a weighting coefficient of a second exposure frame, δ represents a Gaussian distribution coefficient, I'$_1$ represents first brightness data of the first exposure frame, and I'$_2$ represents first brightness data of the second exposure frame.

11. The method according to claim 1, wherein the raw data unit is a data unit arranged in a blue green green red (BGGR) pattern, a data unit arranged in a green red blue green (GRBG) pattern, or a data unit arranged in a green red blue white (GRBW) pattern.

12. An image processing apparatus, comprising:
a processor configured to:
collect at least two exposure frames with different brightnesses in a same scene during different exposure times;
combine, for each exposure frame, a raw data unit arranged repeatedly in the exposure frame to obtain first brightness data after the combining, wherein the raw data unit comprises raw data that are single-channel data comprising pixels with one of a red (R) value, a green (G) value, and a blue (B) value;
acquire a correction parameter of all exposure frames according to all first brightness data;
acquire a weighting coefficient of each exposure frame according to all the first brightness data;
perform brightness processing on each exposure frame to obtain second brightness data after the brightness processing;
acquire, according to the weighting coefficient, the second brightness data, and the first brightness data, a correction factor corresponding to all the exposure frames;
obtain a correction parameter that comprises the weighting coefficient and the correction factor; and perform weighting processing on all the exposure frames by using the correction parameter to obtain a high dynamic range (HDR) image of corrected raw data; and a memory configured to store at least two exposure frames with different brightness that are collected by the processor.

13. The apparatus according to claim 12, wherein the processor is further configured to:

acquire, for each exposure frame, a reference brightness value of the exposure frame; and correct the reference brightness value by using a preset gamma coefficient to obtain the first brightness data.

14. The apparatus according to claim 12, wherein the processor is further configured to:

acquire a weighting coefficient, of each pixel in each exposure frame, corresponding to the exposure frame;

acquire a product obtained by multiplying the correction factor by each pixel in each exposure frame;

summate products corresponding to the pixels at corresponding locations in all exposure frames; and use an image formed by all the pixels obtained after the summating as the HDR image of the corrected raw data.

15. The apparatus according to claim 12, wherein the processor is further configured to:

acquire, for each exposure frame, a reference brightness value of the exposure frame;

correct the reference brightness value by using a preset gamma coefficient to obtain the first brightness data;

acquire a weighting coefficient, of each pixel in each exposure frame, corresponding to the exposure frame;

acquire a product obtained by multiplying the correction factor by each pixel in each exposure frame;

summate products corresponding to pixels at corresponding locations in all exposure frames; and use an image formed by all pixels obtained after the summating as the HDR image of the corrected raw data.

16. The apparatus according to claim 12, wherein the processor is further configured to:

acquire, in a statistical histogram manner, a correspondence between first brightness data of a pixel in a bright exposure frame and first brightness data of a pixel at a corresponding location in a dark exposure frame to obtain a brightness mapping function; and acquire the weighting coefficient of each exposure frame according to the brightness mapping function and all first brightness data.

* * * * *

UNITED STATES PATENT AND TRADEMARK OFFICE
CERTIFICATE OF CORRECTION

PATENT NO. : 9,538,093 B2
APPLICATION NO. : 14/663891
DATED : January 3, 2017
INVENTOR(S) : Hai Chen and Yan Zhang Page 1 of 1

It is certified that error appears in the above-identified patent and that said Letters Patent is hereby corrected as shown below:

In the Claims

Column 13, Line 46, Claim 7 should read:
The method according to claim 6, wherein acquiring, according to the weighting coefficient, the second brightness data, and the first brightness data, the correction factor corresponding to all the exposure frames comprises calculating:

$$\alpha = (I_1'' * w_1 + I_2'' * w_2)/(I_1' * w_1 + I_2' * w_2),$$

wherein $\alpha$ represents the correction factor, $I_1''$ represents second brightness data of the first exposure frame and $I_2''$ represents second brightness data of the second exposure frame.

Column 13, Line 59, Claim 8 should read:
The method according to claim 6, wherein performing the weighting processing on all the exposure frames by using the correction parameter to obtain the HDR image of the corrected raw data comprises calculating $R = (R_1 * w_1 + R_2 * w_2) * \alpha$ to obtain an HDR image of the corrected raw data when the correction parameter is weighting coefficients $w_1$ and $w_2$ and the correction factor, wherein $R_1$ represents the first exposure frame, $w_1$ represents the weighting coefficient of the first exposure frame, $R_2$ represents the second exposure frame, $w_2$ represents the weighting coefficient of the second exposure frame, $\alpha$ represents the correction factor, and $R$ represents the HDR image of the corrected raw data.

Signed and Sealed this
Eleventh Day of April, 2017

Michelle K. Lee
*Director of the United States Patent and Trademark Office*